United States Patent
Nakagawa et al.

(10) Patent No.: US 6,744,591 B2
(45) Date of Patent: Jun. 1, 2004

(54) POSITIONING CONTROL METHOD

(75) Inventors: Shinsuke Nakagawa, Tsuchiura (JP);
Yuji Hata, Odawara (JP); Hiromoto Takeda, Odawara (JP); Kiyotada Ito, Odawara (JP); Takashi Yamaguchi, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 09/742,058

(22) Filed: Dec. 22, 2000

(65) Prior Publication Data

US 2001/0006438 A1 Jul. 5, 2001

(30) Foreign Application Priority Data

Dec. 27, 1999 (JP) .................................. 11-369104
Mar. 15, 2000 (JP) ...................................... 2000-077775

(51) Int. Cl.[7] ............................................. G11B 5/596
(52) U.S. Cl. ................................ 360/78.09; 360/78.06; 360/78.08
(58) Field of Search ..................... 360/78.06, 78.08, 360/78.09; 369/44.25, 44.27, 77.07; 318/561, 562, 563, 564

(56) References Cited

U.S. PATENT DOCUMENTS

| | | | |
|---|---|---|---|
| 5,465,035 A | * 11/1995 | Scaramuzzo et al. | 318/561 |
| 5,668,680 A | * 9/1997 | Tremaine | 360/78.07 |
| 5,699,207 A | * 12/1997 | Supino et al. | 360/78.09 |
| 5,901,009 A | * 5/1999 | Sri-Jayantha et al. | 360/78.07 |
| 5,936,792 A | * 8/1999 | Kobayashi et al. | 360/78.07 |
| 6,198,246 B1 | * 3/2001 | Yutkowitz | 318/561 |
| 6,339,512 B1 | * 1/2002 | Sri-Jayantha et al. | 360/77.04 |
| 6,414,812 B1 | * 7/2002 | Hattori | 360/73.03 |
| 6,574,065 B1 | * 6/2003 | Sri-Jayantha et al. | 360/75 |

OTHER PUBLICATIONS

JP-A-9-139032 (only abstract).

* cited by examiner

Primary Examiner—David Hudspeth
Assistant Examiner—Jason Olson
(74) Attorney, Agent, or Firm—Antonelli, Terry, Stout & Kraus, LLP

(57) ABSTRACT

A positioning control method of a magnetic disc apparatus is provided which can permit fast and stable settling to a target position without overshoot or undershoot in connection with a moving distance of one track seek to about 16-track seek for which positioning must be determined within a moving time corresponding to a resonance frequency of a mechanical system. Such a method can also generate a position/velocity orbit for reducing power at a specified frequency, provide acceleration feed-forward compensation which can permit a head to accurately reach the target position even when the feedback system does not function under a condition that external disturbance does not act and generate a position orbit corrected by a controlled object model accurately modeling resonance oscillation up to a moving frequency band are used in combination.

4 Claims, 11 Drawing Sheets

POSITIONING CONTROL METHOD

BACKGROUND OF THE INVENTION

The present invention relates to a positioning method for use in a magnetic disc apparatus, an XY stage and the like.

In the magnetic disc apparatus serving as an external storage unit of a computer, a magnetic head is moved to an intended track on the surface of a rotating magnetic disc to carry out recording/reproduction of data. In such a scheme, the magnetic head must be moved at a high speed and with high accuracy in order to improve the processing speed of data access. With a view to ensure stable positioning to a target track without overshoot in the procedure of track seek, a method is employed in which an orbit of a target position in the seek procedure is given and the difference between the present position of a head representing a control quantity and the target position is reduced by means of a controller, whereby the head is caused to reach the target position while being caused to follow a desirable position orbit. In that case, with the aim of reducing the difference between the head position and the orbit of the target position, application of acceleration feed-forward for causing the head to follow the target position orbit has been practiced in general. As an example, a method of generating a target position orbit and acceleration feed-forward is disclosed in JP-A-09-139032.

To perform fast positioning, it is important to apply an acceleration feed-forward current which causes the head to accurately follow a given target position orbit so as to be settled to the target position without error. But, when the moving time is shortened to such an extent that the acceleration/deceleration frequency of a drive pattern exceeds the frequency band of a control system, error compression based on following error feedback does not function sufficiently at the time that an orbit following error takes place, with the result that a retard response depending on a closed-loop characteristic of the control system is generated to degrade the capability of position settling. The influence of resonance of a positioning mechanism system acts as a main cause of the orbit following error. For example, in the existing apparatus, the primary resonance frequency of the positioning mechanism is 3 to 4.5 kHz. But, the required drive frequency is 3 kHz or more in the case of one track seek when the drive pattern is subjected to frequency conversion in terms of moving time. Accordingly, unless a primary resonance model of the positioning mechanism is taken into consideration, an orbit following error takes place.

SUMMARY OF THE INVENTION

An object of the present invention to provide a positioning control method for use in magnetic disc apparatus which can permit fast and stable settling to a target position without overshoot and undershoot in connection with a moving distance of one track seek to about 16-track seek for which positioning must be done within a moving time corresponding to the primary resonance frequency of the positioning mechanism.

To accomplish the above object, according to the invention, a method of generating a position/velocity orbit for reducing power at a specified resonance oscillation frequency possessed by the positioning mechanism, a method of generating acceleration feed-forward compensation capable of causing a head to accurately reach a target position even when a feedback system does not function under a condition that external disturbance does not act externally and a method of generating a position orbit corrected by a control target model inclusive of a resonance model of the positioning mechanism and specified accurately up to a moving frequency band are used in combination in a seek operation for moving the head to the target position to perform fast seek in connection with the moving distance of one track seek to about 16-track seek.

DESCRIPTION OF THE EMBODIMENTS

Figure 1:
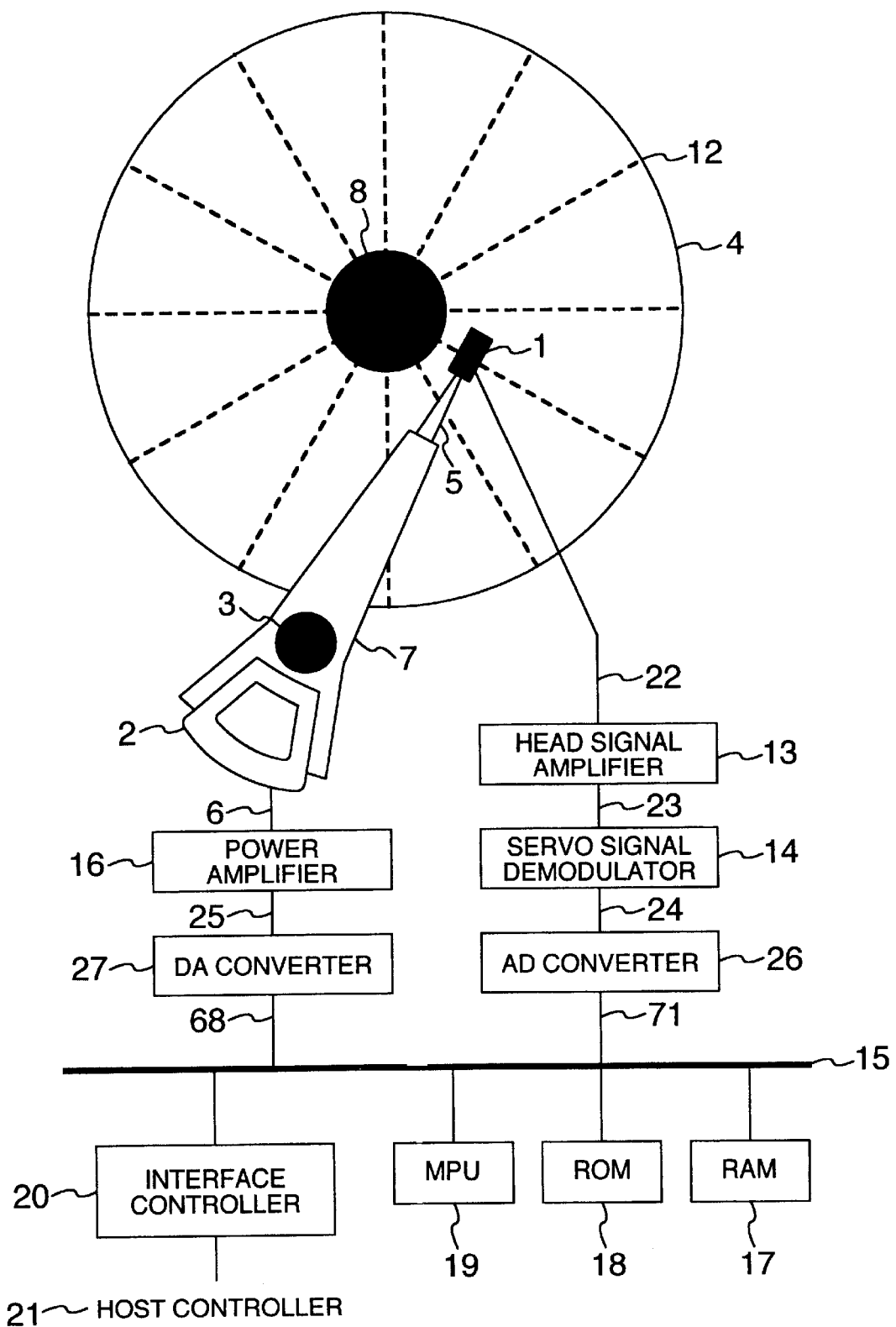
FIG. 1 is a block diagram showing a magnetic head positioning control system for implementing a first embodiment of positioning control methods according to the invention.

Referring now to FIG. 1, a head positioning control system of a magnetic disc apparatus is constructed as shown therein. A spindle motor 8 rotatable at a predetermined speed is fixed to a base not shown. A magnetic disc 4 serving as a recording medium is fixedly mounted to the spindle motor 8. Laterally of the magnetic disc 4 held by the spindle motor 8, a pivot bearing 3 is provided in parallel with the axis of the spindle motor 8. Head support spring 5 and carriage 7 which constitute a hold member of a magnetic head 1 is swingably mounted to the pivot bearing 3. Power for moving the magnetic head 1 is generated by a voice coil motor (VCM) 2. A drive coil, one of constituent parts of the voice coil motor 2, is fixed to the carriage 7. A head actuator is an actuator for positioning the magnetic head 1 and is comprised of the magnetic head 1, head support spring 5, carriage 7, pivot bearing 3 and VCM 2.

A control unit is provided with a microcomputer (MPU) 19. The MPU 19 is coupled to ROM 18 and RAM 17 through a bus 15. Stored in the ROM 18 are programs of various control operations including a seek control operation which are executed by the MPU 19 and parameters necessary for various control operations. The MPU 19 is also coupled with an interface controller 20 through the bus 15. The interface controller 20 receives a command from a host controller 21 to make a request to the MPU 19 for read/write access.

Further, the MPU 19 is coupled to a power amplifier 16 adapted to control current for drive of the actuator and a servo signal demodulator 14 through the bus 15. Servo information is written in radial recording regions called servo sector 12 provided on the disc medium. The servo information 22 read by the head 1 is taken into the servo signal demodulator 14 by way of an amplifier 13. In the servo signal demodulator 14, a track number and a head position signal are demodulated. The MPU 19 calculates an operation signal delivered to the power amplifier 16 by using the signal of the servo signal demodulator 14. The operation signal 68 is converted by a DA converter 27 into a voltage that is delivered as current command value 25 to the power amplifier 16.

Figure 2:
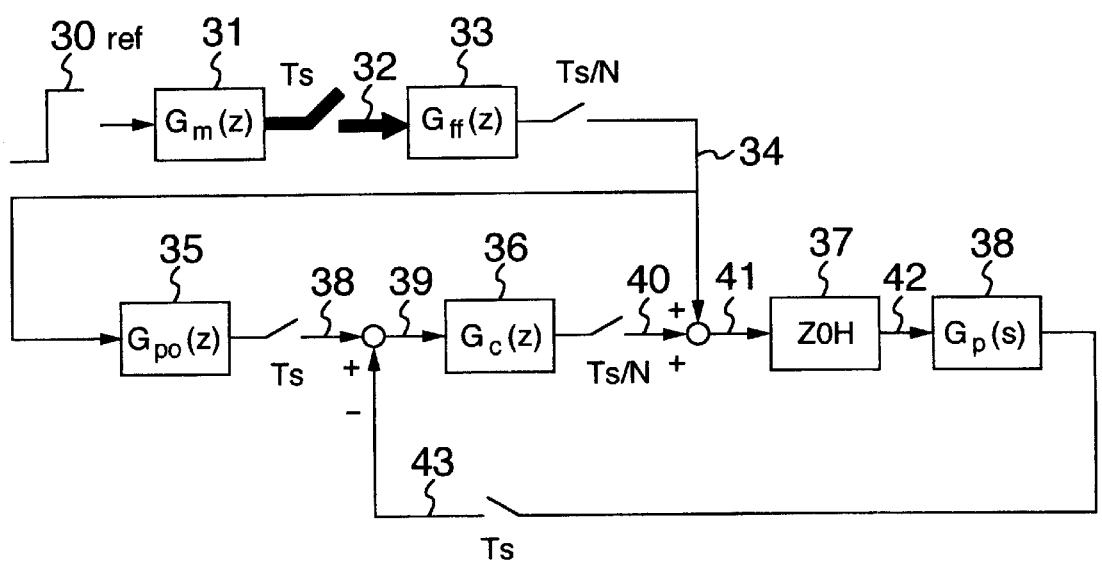
FIG. 2 is a block diagram showing a positioning control method of the invention.

An embodiment of the present invention will be described with reference to FIG. 2. FIG. 2 shows, in block diagram form, a control system for explaining a positioning control method of the invention. A control target 38 is indicated in terms of an expression model of Gp(s). The control target referred to herein means a characteristic ranging from a voltage command value of an AD converter 26 to a head position and Gp(s) is a transfer function indicative of a frequency characteristic. Especially, a model ranging from the VCM current to the head position is called a positioning mechanism system model and is indicated by the sum of a plurality of oscillation modes as expressed by equation (1). In equation (1), "K" represents a forward gain for signals 41 to 43, which is determined from propulsion constant, moment of inertia and the like.

$$P(s) = K \cdot \left( \frac{1}{s^2} + \sum_{i=1}^{n} \frac{a_i}{s^2 + 2 \cdot \zeta_i \cdot \omega_i \cdot s + \omega_i^2} \right) \quad \text{(eq. 1)}$$

Figure 3A:
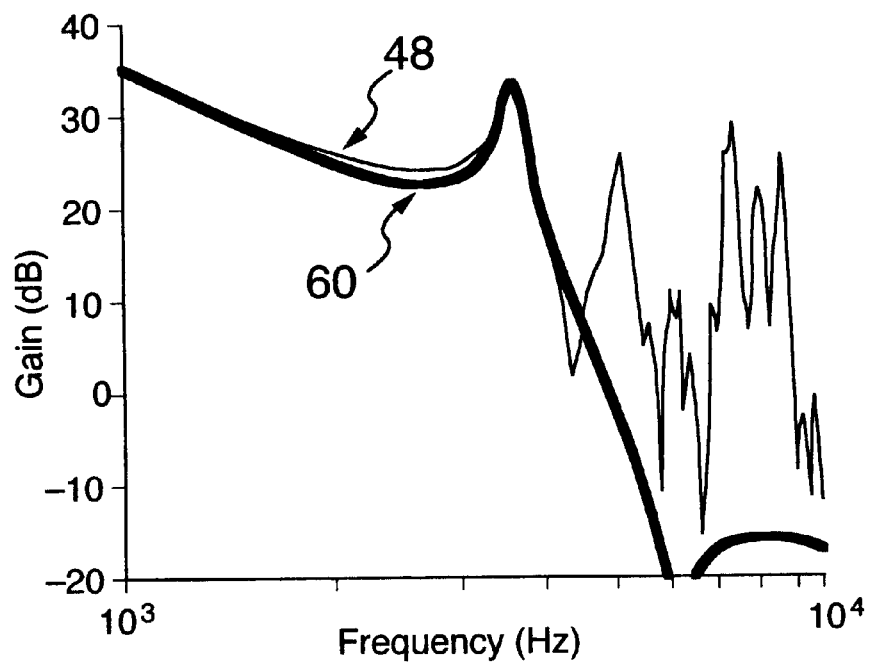
FIGS. 3A and 3B are graphic representations showing frequency characteristics of mechanical system transfer characteristic Gp(s) and a transfer characteristic of control target model $G_{p0}(s)$.
Figure 3B:
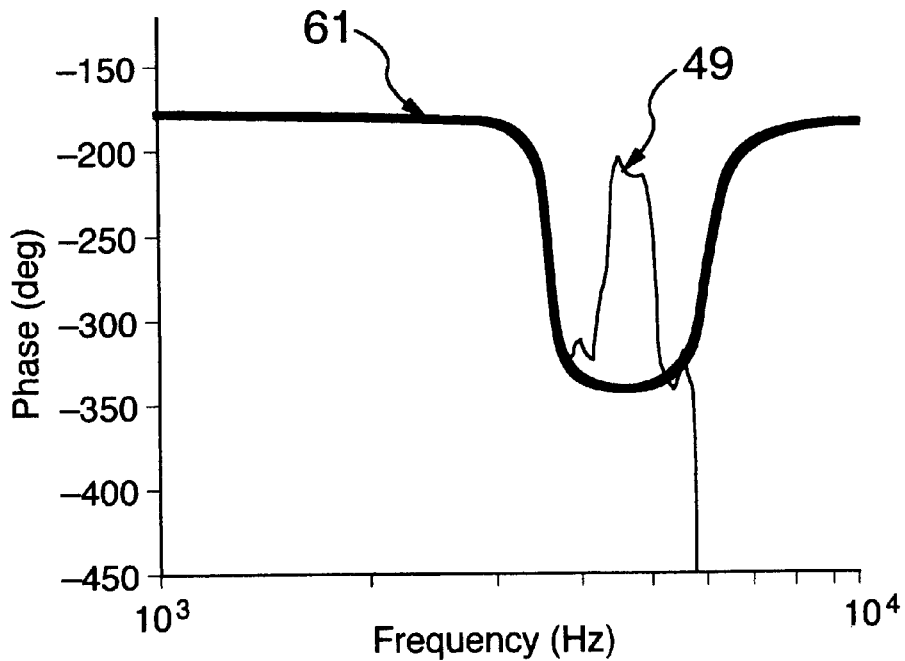

FIGS. 3A and 3B graphically depict frequency characteristics 48 and 49 of the mechanical system and gain characteristic 60 and phase characteristic 61 of $G_{po}(s)$ of equation (10) for L=0 to be described later. As will be seen from the frequency characteristics 48 and 49 in the figures, the control target has a primary resonance oscillation at 3.6 kHz and further has a plurality of resonance oscillations within the range of 5 to 9 kHz. A low-pass filter is connected between the DA converter 27 and the output of current 6.

A position signal representing an output of the controlled object 38 is detected at a constant sampling period Ts by the servo signal demodulator 14 to obtain a position signal 43. Gc(z) of a phase compensator 36 includes a differentiator for assuring stability of the control system and an integrator for improving steady characteristics. By adjusting the forward gain of Gc(z), a round transfer characteristic covering signals 39 to 43 can be adjusted. To set up a standard, Gc(z) is adjusted in such a way that the crossover frequency whose gain is set to 0 dB is about 500 to 1200 Hz, the phase is set to −180° and the crossover frequency whose phase is set to −180° is about 1500 to 2500 Hz to assure that the phase margin representative of a margin of stability can be about 20 to 40 and the gain margin can be about 4 to 6 dB.

Output 40 of the Gc(z) is calculated every Ts/N period and maintained at a constant value during the Ts/N period by means of the DA converter. Such an operation model as above of the DA converter is indicated by Z0H (zero-degree holder) designated at 37. Gff(z) of expression model 33 is adapted to calculate a signal 34 serving as an acceleration feed-forward current command for drive of the controlled object from an orbit 32 of a state quantity such as a targeted position. A calculation method in the Gff(z) will be described hereunder.

Calculation of the present method presupposes that a control input (operation quantity) is applied at a period which is faster, by order n of the controlled object, than a period T' at which a target position orbit is given. But if the ratio T'/T'' between the period T' at which the target state quantity is applied and an update period T'' of the control input is n, the period T' at which the target position orbit is given need not be coincident with the position detecting period Ts. In the present embodiment, it is assumed that N=2 is set, the order of the controlled object is quadratic and the control input is updated at a period which is ½ of the position detection (double multi-rating of operation quantity).

Figure 4:
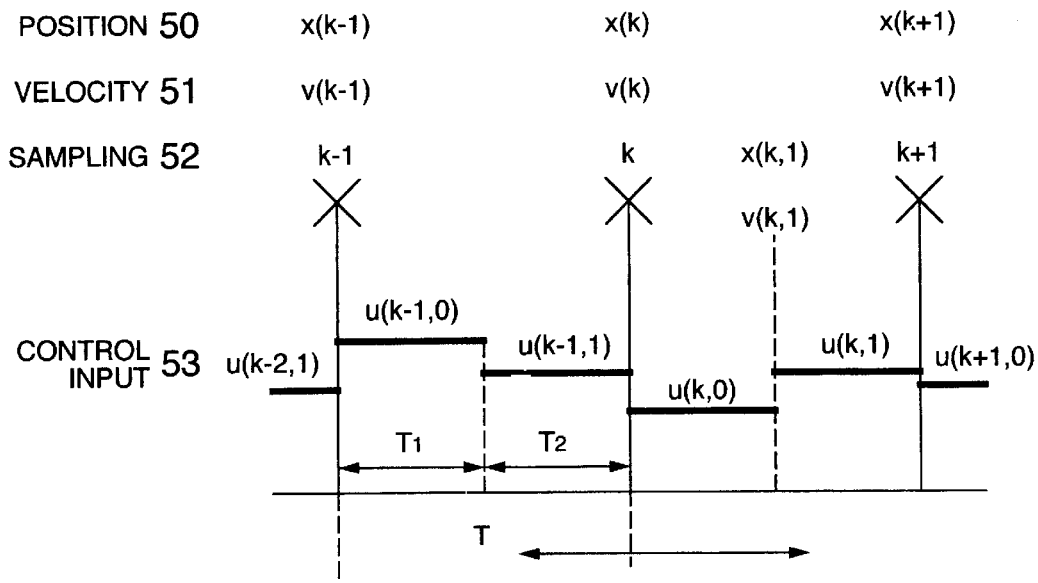
FIG. 4 is a time chart showing a control input and sampling timings of position and velocity.

Referring to FIG. 4, the control input and sampling timing of position and velocity are illustrated. The control input designated at 53 is related to the sampling timing, designated at 52, of state quantity (consisting of position 50 and velocity 51). In the figure, T represents a position detection period and T1 and T2 represent operation quantity output periods, where T=T1+T2. On the assumption that the controlled object is an inertial body represented by a double integrator, the position is represented by x, velocity is represented by v and the acceleration is represented by u, a state equation in continuous time region is given by the following equation.

$$\begin{bmatrix} \dot{x} \\ \dot{v} \end{bmatrix} = \begin{bmatrix} 0 & 1 \\ 0 & 0 \end{bmatrix} \begin{bmatrix} x \\ v \end{bmatrix} + \begin{bmatrix} 0 \\ 1 \end{bmatrix} \cdot u \equiv A_c \begin{bmatrix} x \\ v \end{bmatrix} + b_c \cdot u \quad \text{(eq. 2)}$$

When the equation (2) is made to be discrete at a period t, it is expressed in terms of a discrete time state equation pursuant to equation (3), where $$\begin{bmatrix} x(k+1) \\ v(k+1) \end{bmatrix} = A(t) \begin{bmatrix} x(k) \\ v(k) \end{bmatrix} + b(t) \cdot u(k) \quad \text{(eq. 3)}$$

where $$A(t) = \exp(A_c \cdot t) \text{ and } b(t) = \int_0^t \exp(A_c \cdot \tau) \cdot b_c d\tau \qquad \text{(eq. 4)}$$

Then, x(k),v(k) and u(k, 0) in FIG. 4 are used to determine inter-sampling point state quantities x(k, 1) and v(k, 1) as expressed by equation (5) and the thus determined x(k, 1), v(k, 1) and u(k, 1) are used to determine state quantities x(k+1) and v(k+1) as expressed by equation (6).

$$\begin{bmatrix} x(k,1) \\ v(k,1) \end{bmatrix} = A(T_1) \begin{bmatrix} x(k) \\ v(k) \end{bmatrix} + b(T_1) \cdot u(k,0) \qquad \text{(eq. 5)}$$

$$\begin{bmatrix} x(k+1) \\ v(k+1) \end{bmatrix} = A(T_2) \begin{bmatrix} x(k,1) \\ v(k,1) \end{bmatrix} + b(T_2) \cdot u(k,1) \qquad \text{(eq. 6)}$$

The equations (5) and (6) are put together to obtain a discrete time state equation within the range between x(k), v(k) and x(k+1), v(k+1) pursuant to equation (7).

$$\begin{bmatrix} x(k+1) \\ v(k+1) \end{bmatrix} = A(T_2)A(T_1) \begin{bmatrix} x(k) \\ v(k) \end{bmatrix} + [A(T_2) \cdot b(T_1) b(T_2)] \begin{bmatrix} u(k,0) \\ u(k,1) \end{bmatrix} \qquad \text{(eq. 7)}$$
$$\equiv A(T) \cdot \begin{bmatrix} x(k) \\ v(k) \end{bmatrix} + B \cdot \begin{bmatrix} u(k,0) \\ u(k,1) \end{bmatrix}$$

In equation (7), matrix B is a 2×2 matrix and is regular (determinant≠0) if T1>0 and T2>0 stand and therefore, the matrix B has an inverse matrix.

Accordingly, the equation (7) can be reduced to equation (8).

$$\begin{bmatrix} u(k,0) \\ u(k,1) \end{bmatrix} = B-1 \cdot \left\{ \begin{bmatrix} x(k+1) \\ v(k+1) \end{bmatrix} - A(T) \cdot \begin{bmatrix} x(k) \\ v(k) \end{bmatrix} \right\} \qquad \text{(eq. 8)}$$

The equation (8) demonstrate that control inputs u(k, 0) and u(k, 1) which permit arrival at x(k+1) and v(k+1) at (k+1)-th sampling can be obtained by providing values of position x and velocity v at k-th sampling and coming values of position and velocity at (k+1)-th sampling. By subjecting the equation (8) to z conversion, the transfer characteristic Gff(z) within the range between [x(k), v(k)]' and [u(k, 0), u(k, 1)]' can be determined as expressed by equation (9).

$$G_{ff}(z) = \frac{1}{K} B^{-1} \cdot (z \cdot I - A(T)) \qquad \text{(eq. 9)}$$

Transfer characteristic model 35 ($G_{po}(z)$) is applied to calculate a target position orbit from the feed-forward operation quantity [u(k, 0), u(k, 1)]' and corresponds to a modeled transfer characteristic covering signals 41 to 43 in FIG. 2. More specifically, Gp(s) is indicated by equation (10) from a mechanism model established by accurately specifying the resonance oscillation model of the positioning mechanism up to the moving frequency band and time lag L which is the sum of a time lag between position detection and delivery of control input signal 41 and an equivalent time lag determined by converting a phase delay characteristic of VCM amplifier and the like into a time lag.

$$G_{pO}(s) = K \cdot \left( \frac{1}{s^2} + \sum_{i=1}^{q} \frac{a_i}{s^2 + 2 \cdot \zeta_i \cdot \omega_i \cdot s + \omega_i^2} \right) \cdot e^{-Ls} \qquad \text{(eq. 10)}$$

where "K" represents a forward gain for signals 41 to 43, which is determined from propulsion constant, position detection sensitivity and the like.

In this model, the transfer characteristic $G_{pO}(z)$ is determined by taking into account the fact that the control input changes at the period Ts/N and the position signal can be detected at the Ts/N period. The present embodiment presupposes that N=2 is set and the control input is updated at a period which is ½ of position detection (double multi-rating of operation quantity). With q=1 set in equation (10), Gp(s) accurately models a transfer characteristic up to a primary mechanical resonance frequency of 3.6 kHz. This model is represented by gain and phase characteristics 60 and 61 in FIGS. 3A, 3B and when compared with the gain and phase characteristics 48 and 49 of the positioning mechanism system constituting the controlled object, the present model exhibits that the frequency characteristic up to the primary resonance point substantially coincides with that of the positioning mechanism system.

The equation (10) can be expressed in terms of a state equation of continuous time model pursuant to equation (11).

$$\dot{X}_c(t) = A_c \cdot X_c(t) + b_c \cdot u \qquad \text{(eq. 11)}$$
$$y(t) = C_c \cdot X_c(t)$$

where y represents position.

Figure 5:
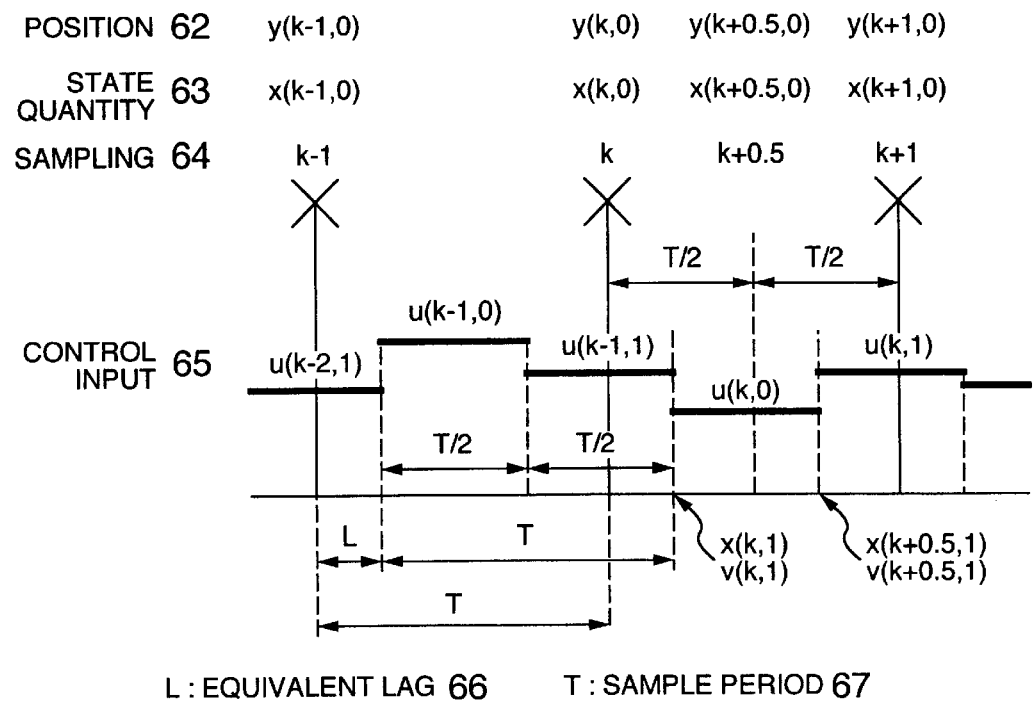
FIG. 5 is a time chart showing a control input and sampling timings of position detection under a discrete time state considering a delay during double multi-rating (in the case of an equivalent delay of L<T/2).

Referring to FIG. 5, there is illustrate the relation between the control input and the sampling timing of position detection in the case of discreteness considering the delay during double multi-rating (for the equivalent time lag being L<T/2). In other words, there is a illustrated model of control input update and position detection sampling timing necessary for the $G_{pO}(z)$ to calculate a target position orbit y(k) 38 from the control input [u(k, 0), u(k, 1)]'. In the present embodiment, an instance where the equivalent time delay L is L<T/2 will be studied. Variables as shown in FIG. 5 are introduced. Parenthesis added to the variable indicates the sample timing, "k" indicates the position detection timing (servo sample), "u" indicates the operation quantity and y indicates the position. Then, a discrete time state equation from state variables X at (k, 0) sample to state variables at (k+1, 0) sample will be determined.

Firstly, $$X(k,1) = A(L) \cdot X(k,0) + B(L) \cdot u(k-1,1) \qquad \text{(eq. 12)}$$

$$X(k+0.5,0) = A\left(\frac{T}{2} - L\right) \cdot X(k,1) + B\left(\frac{T}{2} - L\right) \cdot u(k,0) \qquad \text{(eq. 13)}$$

$$X(k+0.5,1) = A(L) \cdot X(k+0.5,0) + B(L) \cdot u(k,0) \qquad \text{(eq. 14)}$$

$$X(k+1,0) = A\left(\frac{T}{2} - L\right) \cdot X(k+0.5,1) + B\left(\frac{T}{2} - L\right) \cdot u(k,1) \qquad \text{(eq. 15)}$$

where $$A(t) = \exp(A_c \cdot t) \text{ and } B(t) = \int_0^t \exp(A_c \cdot \tau) \cdot b_c d\tau \qquad \text{(eq. 16)}$$

Then, the discrete time state equation from X(k, 0) to X(k+1, 0) is determined from equation (12), (13), (14) and (15) and expressed by equation (17).

$$X(k+1, 0) = A(T) \cdot X(k, 0) + \quad \text{(eq. 17)}$$

$$A(T-L) \cdot B(L) \cdot u(k-1, 1) + A\left(\frac{T}{2}\right) \cdot B\left(\frac{T}{2} - L\right) \cdot u(k, 0) +$$

$$A\left(\frac{T}{2} - L\right) \cdot B(L) \cdot u(k, 0) + B\left(\frac{T}{2} - L\right) \cdot u(k, 1)$$

$$y(k, 0) = C_c \cdot X(k, 0)$$

A transfer characteristic indicating the equation (17) in terms of pulse transfer function $G_{p0}(z)$ from the control input 34 $[u(k, 0), u(k, 1)]'$ to the position target value 38 is given by equation (18).

$$G_{p0}(z) = C_{p0} \cdot (z \cdot I - A_{p0})^{-1} \cdot B_{p0} \quad \text{(eq. 18)}$$

where $A_{p0}$, $B_{p0}$ and $C_{p0}$ are indicated by equations (19) to (21), respectively.

$$A_{p0} = \begin{bmatrix} A(T) & A(T-L) \cdot B(L) \\ 0 & 0 \end{bmatrix} \quad \text{(eq. 19)}$$

$$B_{p0} = \begin{bmatrix} A\left(\frac{T}{2}\right) \cdot B\left(\frac{T}{2} - L\right) + A\left(\frac{T}{2} - L\right) \cdot B(L) & B\left(\frac{T}{2} - L\right) \\ 0 & 1 \end{bmatrix} \quad \text{(eq. 20)}$$

$$C_{p0} = [C_c \quad 0] \quad \text{(eq. 21)}$$

Gm(z) is a transfer characteristic 31 for determining a time response of position when head moves to a target position and is called an orbit generation model. Specifically, a step response of Gm(z) defines a target orbit of a desirable position.

In the present embodiment, the $G_{p0}(z)$ is accurately modeled up to the 3.6 kHz primary resonance frequency as shown at frequency characteristics 60 and 61 in FIGS. 3A, 3B. Consequently, when power at the primary mechanical resonance frequency is great on a given orbit, the target orbit of position calculated pursuant to transfer function (35) oscillates at the primary mechanical resonance frequency. Therefore, the orbit generation model expressed by Gm(z) is applied in such a manner that power at the primary resonance frequency can be reduced. In order to provide Gm(z) that meets this purpose, there is a simple method in which a transfer function is given in the following procedure to calculate an orbit.

Firstly, a transfer function Gm(s) of continuous time is given by the following equation.

$$G_m(s) = \frac{\frac{1}{\omega_r^2} s^2 + \frac{2 \cdot \zeta_r}{\omega_r} s + 1}{\prod_{i=1}^{r} (\tau_i \cdot s + 1)^i} \quad \text{(eq. 22)}$$

Next, step responses of Gm(s) and s·Gm(s) are calculated, where the step response of Gm(s) represents a position orbit x(t) and the step response of s·Gm(s) represents a velocity orbit v(t). Finally, the calculated x(t) and v(t) are sampled, from the beginning, at the position detecting period Ts shown in FIG. 2 to determine x(k) and v(k). The expression model Gm(s) is expressed by equation (23) in terms of a state equation. Thus, when the output is ym(t)=[x(t), v(t)]', there results $$\dot{X}_m(t) = A_{mc} \cdot X_m(t) + B_{mc} \cdot u_m(t) \quad \text{(eq. 23)}$$

$$y_m(t) = C_{mc} \cdot X_m(t)$$

From this, Gm(z) of the transfer characteristic 31 can be expressed by the following equation through the use of a value of equation (23).

$$G_m(z) = z \cdot C_{mc} \cdot (z \cdot I - eA_{mc} \cdot T_s)^{-1} \cdot B_{mc} \quad \text{(eq. 24)}$$

Derivation of expression models of the individual blocks in FIG. 2 has been set forth so far. Next, flow of signals in FIG. 2 will be described by way of example of seek of a target track.

When a seek start instruction is applied, a target value 30 is set. Responsive thereto, the block 31 calculates desirable target position orbits x(k) and x(k+1) and target velocity orbits v(k) and v(k+1) which are represented by signal 32. From the calculation result signal 32, the block 33 calculates an acceleration feed-forward input [u(k, 0), u(k, 1)] represented by signal 34. On the basis of the signal 34, the block 35 calculates signal 38 indicative of a position target value. Difference signal 39 between the signal 38 and signal 43 indicative of an actual head position detection value is determined and then, with the aim of reducing a component of difference signal 39 attributable to, for example, external disturbance, the block 36 representing a phase compensator calculates control signal 40. Signal 41 obtained by adding the signals 34 and 40 is delivered, as a control input, to the block 37 serving as the DA converter model to control the head such that it moves while following the desirable target orbit. When a seek distance is determined, each of the signals 34 and 38 can be determined definitely as a function of time. Accordingly, the signals 34 and 38 are calculated in advance and can be tabulated in the form of a function of time and can be stored in the ROM 18.

The present invention is directed to the positioning control method using Gff(z), $G_{p0}(z)$ and Gm(z) determined in accordance with the method as above. It will be demonstrated by the procedures as below that the present method is most effective for speed-up and stabilization of short distance seek especially corresponding to one track seek to 16-track seek. "Stabilization" referred to herein means settling to the target position that is freed from overshoot and undershoot.

Procedure 1: The orbit generation method is carried out by Gm(z) of equation (24).

Procedure 2: It is indicated by the time waveform and power spectrum waveform of drive current that a drive pattern for reducing power at a specified resonance frequency of the positioning mechanism can be generated from the orbit of procedure 1 by means of the Gff(z). Further, availability of the acceleration feed-forward compensation generating method is confirmed which can permit the head to reach the target position correctly even in the event that the feedback system does not function under a condition that no external disturbance acts on the head actuator. This is of significance from the standpoint of reduction of a following error 39.

Procedure 3: On the basis of the controlled object model $G_{p0}(z)$ which is correctly specified up to the moving frequency band inclusive of the primary resonance model of the positioning mechanism, it is demonstrated that the corrected position orbit can reduce the orbit following error 39.

The above procedures have excellence in speed-up and stability of short distance seek as will be describe below. A description will be given by way of example of one-track seek. The shorter the moving time and the larger the moving distance, the greater the power spectrum in the drive pattern becomes. As a result, the resonance oscillation of the positioning mechanism is excited. Then, with a view of making the subsequent comparison conditions intact, an orbit is generated for which the moving time is a time required to reach a position being 0.2 μm or less short of the target position and amounting up to 0.34 ms (7 samples). The moving distance is so prescribed as to be 1.6 μm (an amount corresponding to one track seek). As an evaluation scale of stability of settling, there is provided such prescription that after arrival at 0.2 μm or less, overshoot or undershoot of the position error does not exceed ±5% of track pitch.

Figure 6:
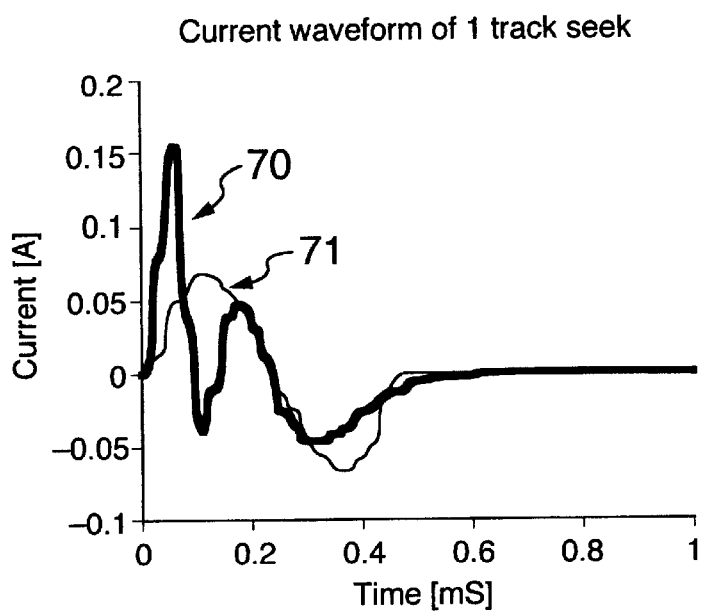
FIG. 6 is a graph showing a time response of current 6 when a signal output of Gff(z) pursuant to equation (9) during one track seek is subjected to current conversion by a power amplifier 16.

In accordance with the procedure 1, the orbit is generated from the equation (22) as described previously. Acceleration feed-forward orbit 34 is calculated by using Gff(z) for the position and velocity orbit generated from equation (22) in accordance with the procedure 2. A time response possessed by current 6 when signal 34 of FIG. 2 undergoes current conversion by means of the power amplifier 16 at that time is designated at 70 in FIG. 6. In the time waveform of the drive pattern generated from equation 22, acceleration is divisionally carried out twice, so that power at the 3.6 kHz primary resonance oscillation frequency can be reduced. This will be clearly understood from power spectrum waveform 72 of current waveform 70 shown in FIG. 7 and it is indicated that the power spectrum waveform 72 is reduced at a frequency component of 3.6 kHz of primary resonance.

Figure 8:
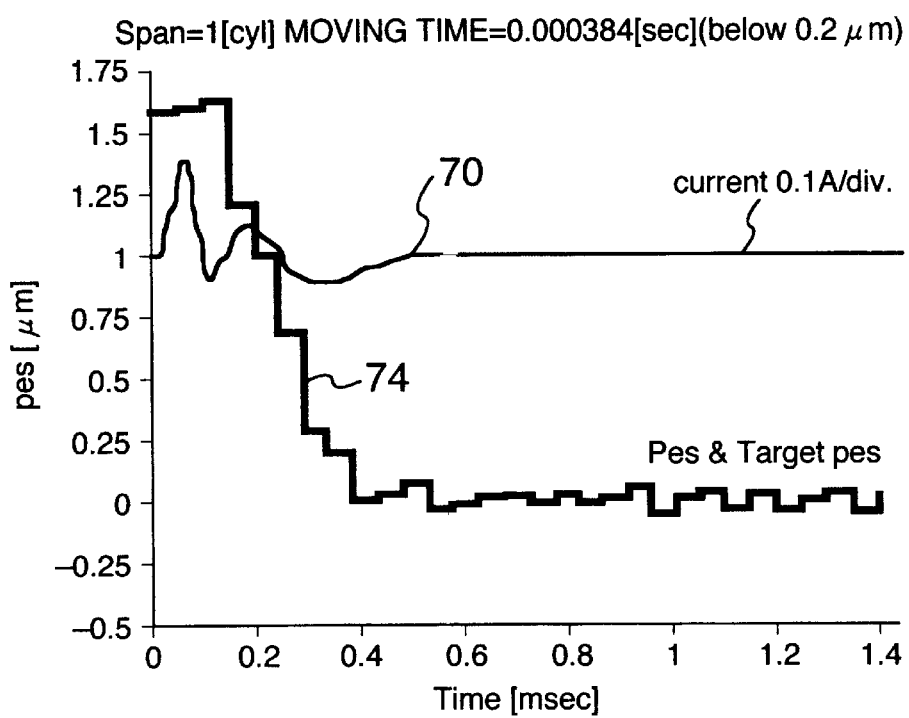
FIG. 8 is a graph showing a response of one track seek when a signal 34 generated from Gff(z) pursuant to equations (24) and (9) is used for acceleration feed-forward and a feedback signal 40 is made to be zero.

Further, it can be confirmed by making the signal 40 of FIG. 2 zero that the acceleration feed-forward compensation generating method based on Gff(z) can cause the head to accurately reach the target position even when the feedback system does not function under a condition that no external disturbance acts externally. Where the signal 34 generated from equation (22) and Gff(z) is used for acceleration feed-forward and the feedback signal 40 is made to be zero, waveform 74 in FIG. 8 is obtained by sampling a position error for the target position of one track seek at the detection period Ts. It will be seen that even in the absence of the feedback signal, the head arrived at the target position. Small oscillation near the target position results from the influence of the term, indicated by equation (25), in the equation (1). Since $|a_i|<1$ and whose DC gain (gain under a condition of s→0) is sufficiently smaller than that of equation (26), the DC gain of equation (25) does not influence the arrival of the head at a target.

$$\sum_{i=1}^{n} \frac{K \cdot a_i}{s^2 + 2 \cdot \zeta_i \cdot \omega_i \cdot s + \omega_i^2} \quad \text{(eq. 25)}$$

$$\frac{K}{s^2} \quad \text{(eq. 26)}$$

Figure 9A:
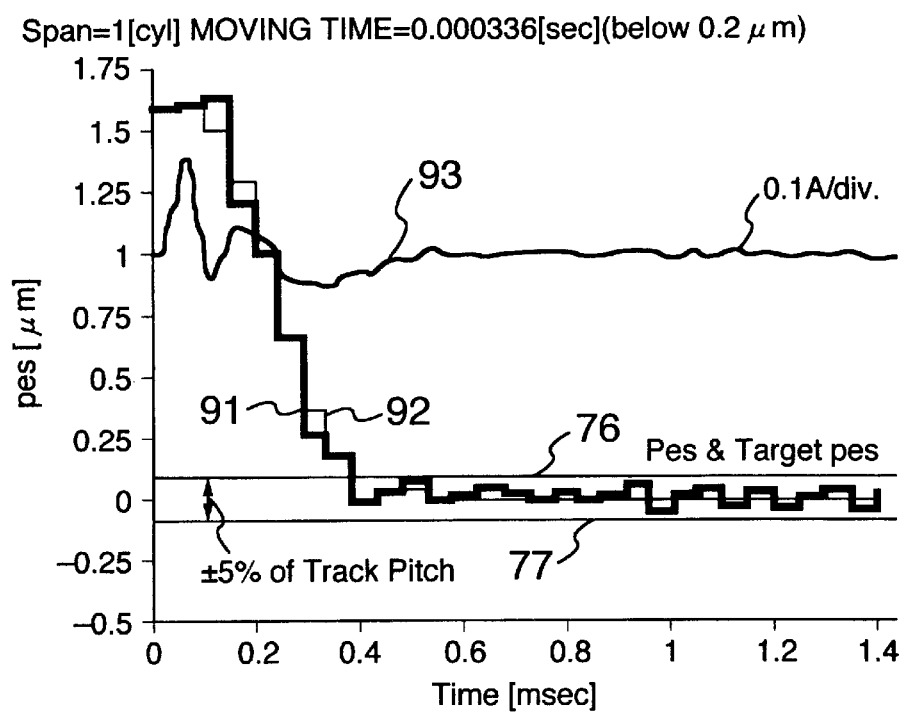
FIGS. 9A and 9B are graphic representation showing a response waveform of one track seek when a signal 34 generated from Gff(z) pursuant to equations (22) and (9) is used for acceleration feed-forward and correction of target position orbit is carried out in accordance with equation (10) for modeling the primary resonance oscillation.
Figure 9B:
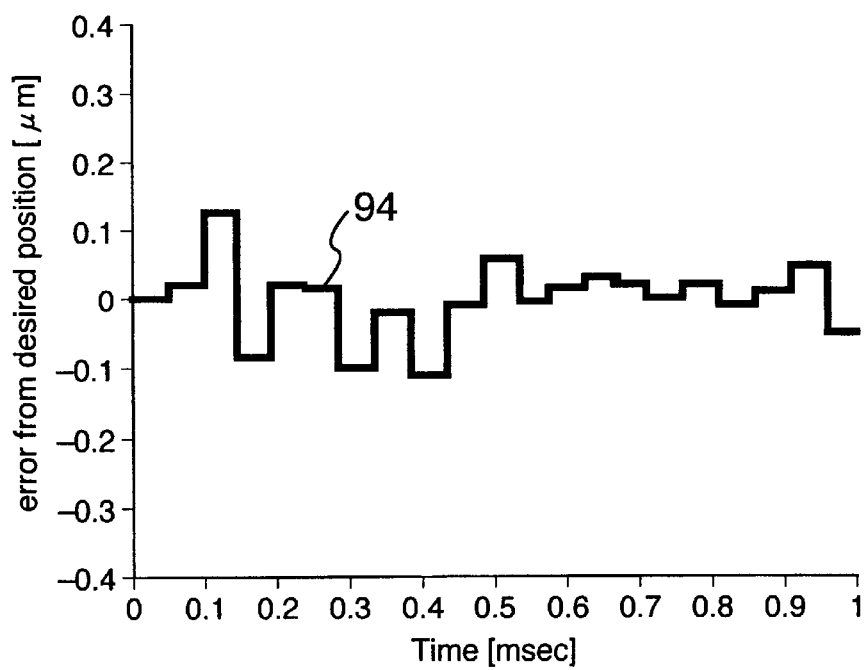

In the position orbit corrected in accordance with the procedure 3 by the controlled object model $G_{po}(z)$ specified accurately up to the moving frequency band inclusive of the primary resonance model of the positioning mechanism, the orbit following error can be reduced. This will now be evaluated. $G_{po}(z)$ is given on the basis of equation (10) taking the 3.6 kHz primary resonance oscillation into account. Illustrated in FIG. 9A are a response waveform 91 obtained by sampling the position error for the target position at the period Ts, a current waveform 93 at that time and an orbit 92 of the target position. The orbit 92 of the target position is settled without overshoot and the response 91 of the position error is confined within ±5% of track pitch in the specification. Illustrated in FIG. 9B is a following error waveform 94 of the head position for the target orbit at that time. As shown, the maximum of the orbit following error is small, amounting to 0.13 μm.

Next, a second embodiment of the present invention will be described. In the present embodiment, the controlled object model $G_{po}(z)$ described in connection with the procedure 3 in the first embodiment is changed to that devoid of the primary resonance model and the remaining construction is identical to that of the first embodiment. When the primary resonance model is not considered, $G_{po}(z)$ is expressed by equation (27).

$$G_{po}(s) = \frac{K}{s^2} \cdot e^{-Ls} \quad \text{(eq. 27)}$$

Here, for making the comparison conditions identical to those in the first embodiment, the moving time is prescribed by a time required to reach a position being 0.2 μm or less short of the target position and amounting up to 0.34 ms. The moving distance is prescribed as 1.6 μm (an amount corresponding to one track seek). An evaluation scale of stability of settling is prescribed such that after arrival at 0.2 μm or less, overshoot and undershoot of the position error does not exceed ±5% of track pitch.

Figure 10A:
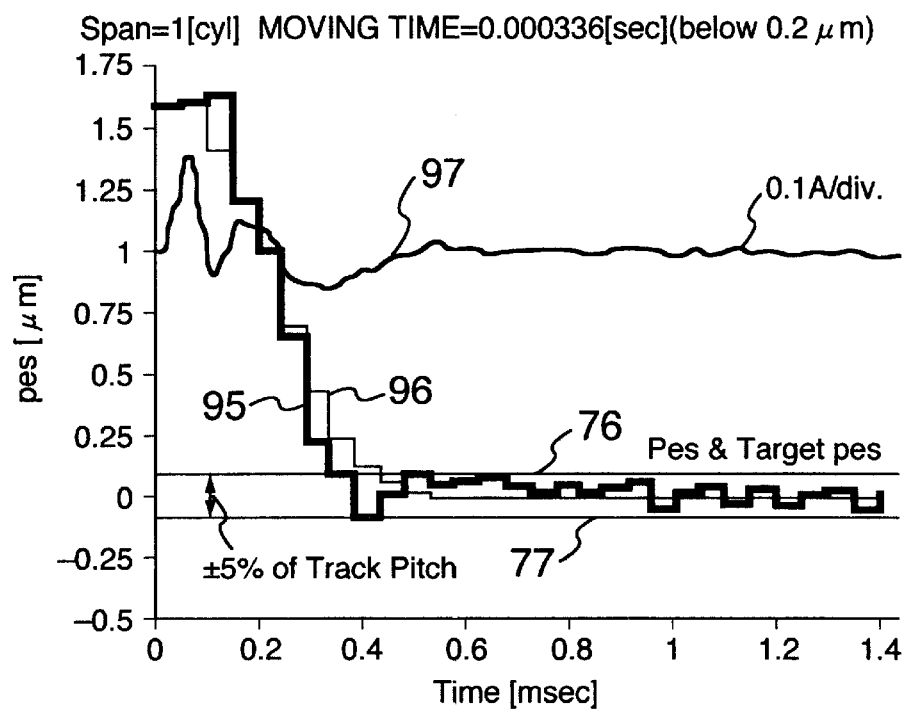
FIGS. 10A and 10B are graphic representations showing a response waveform of one track seek when the signal 34 generated from Gff(z) pursuant to equations (22) and (9) is used for acceleration feed-forward and correction of target position orbit is carried out in accordance with equation (27) not modeling the primary resonance oscillation.
Figure 10B:
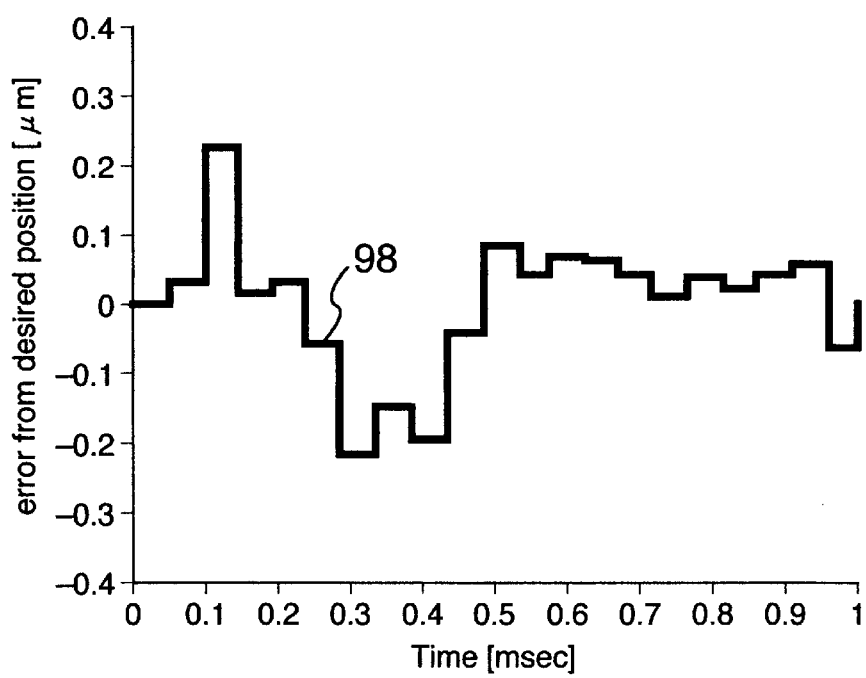

The drive pattern is identical to the orbit of the first embodiment given from the equation (22) for reduction of power at the 3.6 kHz frequency. Illustrated in FIG. 10A are a response waveform 95 obtained by sampling the position error for the target position at the period Ts, a current waveform 97 at that time and an orbit 96 of the target position. In the position error response waveform 95, the undershoot slightly exceeds ±5% of the settling specifications and the overshoot scarcely meets the specifications. Accordingly, when compared with the case of FIG. 9A, the settling response is degraded and the specifications are not satisfied. A following error waveform 98 of the head position for the target position orbit at that time is shown in FIG. 10B. The maximum of the following error is 0.22 μm and as compared to the waveform 94 in FIG. 9B, is about 40% degraded. An increased following error deteriorates the settling stability. But, $G_{po}(s)$ is simplified and the calculation load is small.

A third embodiment of the present invention will be described. In the present embodiment, the orbit generation model described in connection with the procedure 1 in the first embodiment is changed to an adding acceleration minimizing drive pattern (minimum jerk orbit) and the remaining construction is the same as that of the first embodiment. In the adding acceleration minimizing drive pattern, the position x is expressed by a function of time t pursuant to equation (28), the velocity v is expressed by a function of time t pursuant to equation (29) and the acceleration a is expressed by a function of time t pursuant to equation (30), where Tmv represents the moving time and Dmv represents the moving distance.

$$x = D_{mv}\left\{-6\left(\frac{t}{T_{mv}}\right)^5 + 15\left(\frac{t}{T_{mv}}\right)^4 - 10\left(\frac{t}{T_{mv}}\right)^3 + 1\right\} \quad \text{(eq. 28)}$$

$$v = \frac{D_{mv}}{T_{mv}}\left\{-30\left(\frac{t}{T_{mv}}\right)^4 + 60\left(\frac{t}{T_{mv}}\right)^3 - 30\left(\frac{t}{T_{mv}}\right)^2\right\} \quad \text{(eq. 29)}$$

-continued $$a = \frac{D_{mv}}{T_{mv}^2}\left\{-120 \cdot \left(\frac{t}{T_{mv}}\right)^3 + 180 \cdot \left(\frac{t}{T_{mv}}\right)^2 - 60 \cdot \left(\frac{t}{T_{mv}}\right)\right\} \quad \text{(eq. 30)}$$

To assure the comparison conditions to be identical to those in the first embodiment, a description will be given by way of example of one track seek. In one track seek, the moving distance is set to 1.6 μm and a time required to make the offset from the target center 0.2 μm or less is set to 0.34 ms. The present embodiment will be described in accordance with the same procedures as those in the first embodiment.

In procedure 1, orbits are generated from the equations (28) and (29).

Figure 7:
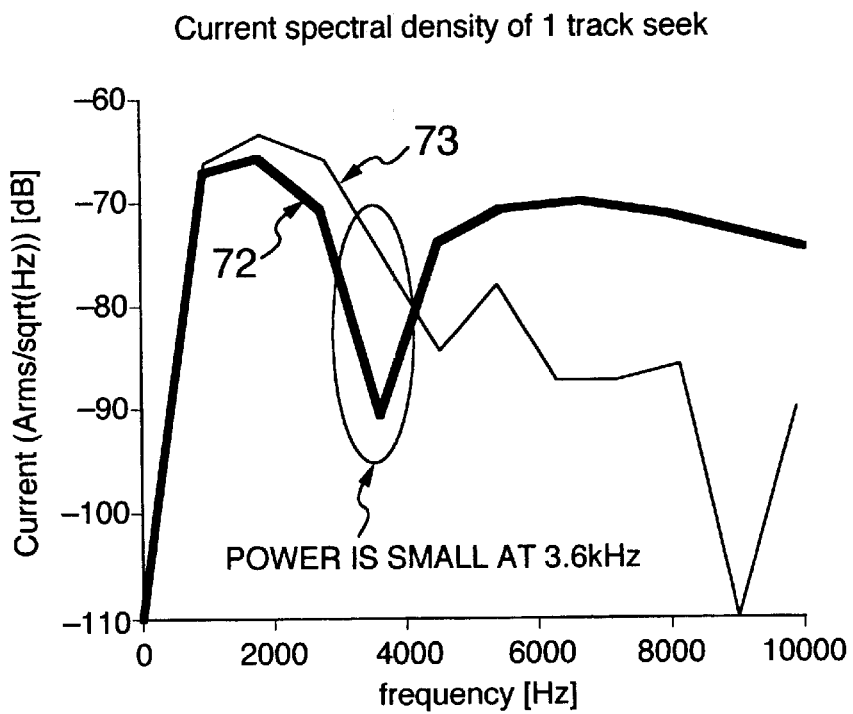
FIG. 7 is a graph showing power spectral density of the current 6 when the signal output of Gff(z) pursuant to equation (9) during one track seek is subjected to current conversion by the power amplifier 16.

In procedure 2, an acceleration feed-forward orbit 34 is calculated from the position orbit of equation (28) and the velocity orbit of equation (29) by using Gff(z). A time response of current 6 obtained by converting the signal 34 into current by means of the power amplifier 16 is shown at 71 in FIG. 6. As shown in FIG. 7, a power spectrum waveform 73 of current waveform 71 is higher than the current power spectrum waveform 72 in the first embodiment at the 3.6 kHz frequency of the primary resonance of the positioning mechanism.

Figure 11:
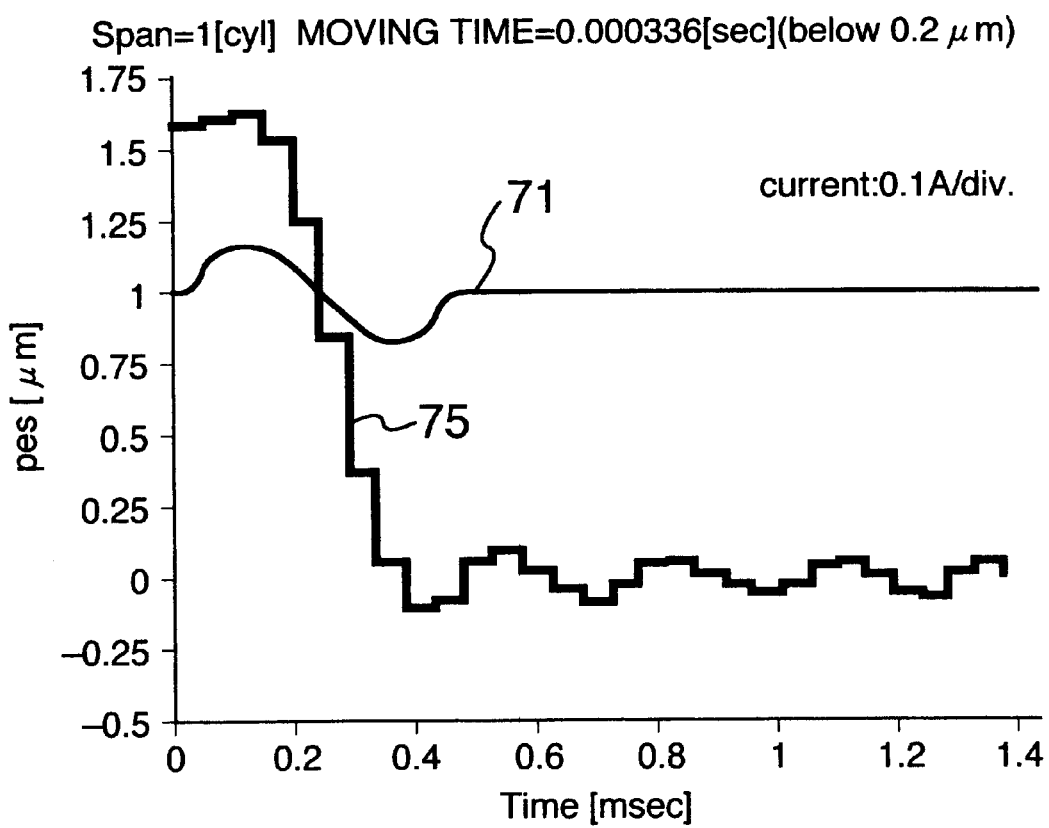
FIG. 11 is a graph showing a response of one track seek when the signal 34 generated from Gff(z) pursuant to equations (28), (29) and (9) are used for acceleration feed-forward and the feedback signal 40 is made to be zero.

When the signal 34 generated from the equations (28) and (29) and Gff(z) is used for acceleration feed-forward and the feedback signal 40 is made to be zero, a waveform 75 in FIG. 11 corresponds to a sampling waveform of a position error from the target position during one track seek. Like the waveform 74, the target position can be reached even in the absence of the feedback signal, demonstrating that even when the feedback system does not function under a condition that external disturbance does not act, the head can be caused to accurately reach the target position. Oscillation near the target position is attributable to the term, as indicated by equation (25), in the equation (1). Since the DC gain for equation (26) is sufficiently small and the oscillation takes place around the arrival position alone. The waveform 75 oscillates more greatly than the waveform 74 at the 3.6 kHz frequency. This oscillation corresponds to the primary resonance oscillation of the head positioning mechanism and when the actuator is caused to move, especially, at a high speed as in the case of the one track seek, the fundamental frequency of the drive pattern approaches the primary resonance frequency, causing the residual oscillation during settling to increase necessarily.

Figure 12A:
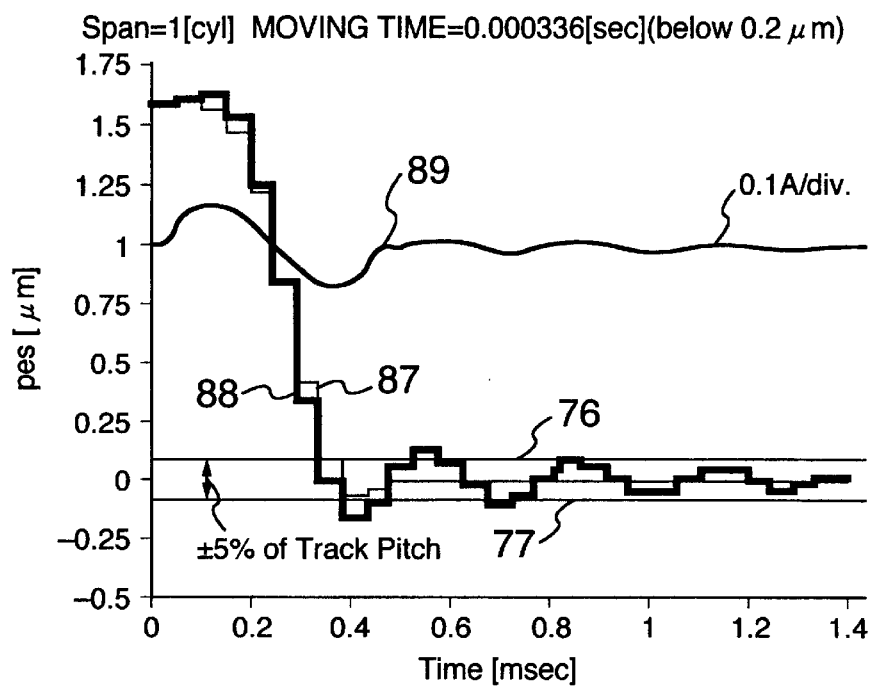
FIGS. 12A and 12B are graphic representations showing a response waveform of one track seek when the signal 34 generated from Gff(z) pursuant to equations (28), (29) and (9) are used for acceleration feed-forward and correction of target position orbit is carried out in accordance with equation (10) modeling the primary resonance oscillation.
Figure 12B:
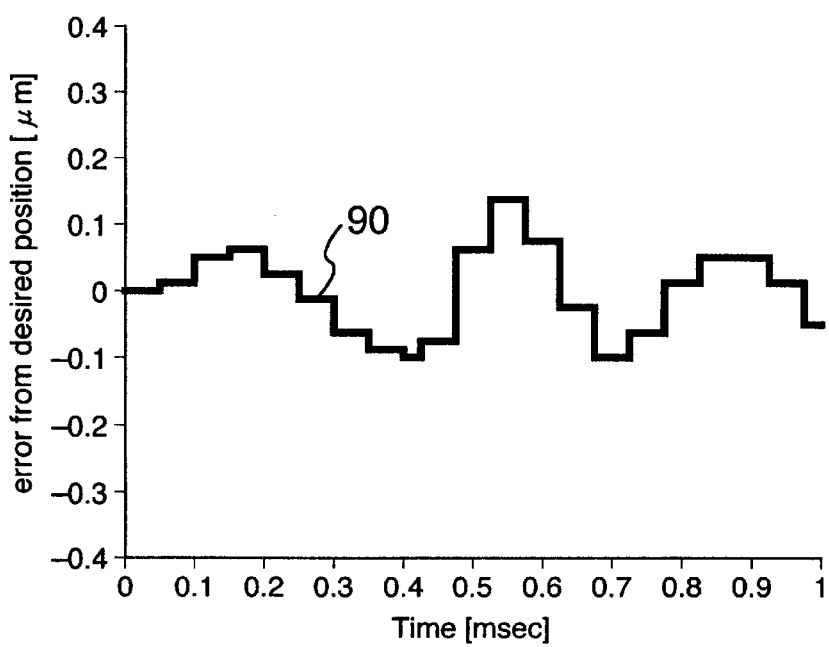

In procedure 3, $G_{p0}(z)$ is given on the basis of equation (10) considering the primary resonance oscillation model at 3.6 kHz. Illustrated in FIG. 12A are a response waveform 88 of the position error for the target position sampled at the period Ts, a current waveform 89 at that time and an orbit 87 of the target position. An orbit 87 of the target position overshoots. This signifies that when the target position orbit is corrected on the basis of a model including the primary resonance, power at the primary resonance frequency in the drive pattern needs to be reduced as in the case of the first embodiment. Illustrated in FIG. 12B is a following error waveform 90 of the head position for the target position orbit in that case. In the present embodiment, the orbit is smooth and when many oscillation modes exist, these modes are hardly excited to advantage.

The foregoing first to third embodiments can be summed up as below from the standpoint of the difference in the calculation method of $G_{p0}(z)$ of the block 35 and Gm(z) of the block 31.

First embodiment: The $G_{p0}(z)$ models the 3.6 kHz primary resonance of the positioning mechanism. The Gm(z) reduces power at 3.6 kHz pursuant to equation (22) (FIGS. 9A, 9B). Second embodiment: The $G_{p0}(z)$ does not model the 3.6 kHz primary resonance of the positioning mechanism. The Gm(z) reduces power at 3.6 kHz pursuant to equation (22) (FIGS. 10A, 10B). Third embodiment: The $G_{p0}(z)$ models the 3.6 kHz primary resonance of the positioning mechanism. The Gm(z) provides the adding acceleration minimum orbit (calculated from equations (28) and (29) by using Gff(z)) (FIGS. 12A, 12B). The moving time is set such that the same condition can be set for the seek time to obtain the results according to the first to third embodiments and therefore, when summing up from the standpoint of the settling stability, the first to third embodiments are ranked in this order. When the specifications of stability of settling is such that the track pitch of overshoot and undershoot is set to ±5% or less after a position being 0.2 μm or less short of the target position is reached, only the first embodiment satisfies the specifications. As will be seen from the above description, the construction of the present invention is the most effective for speed-up and settling stabilization in the one track seek.

While the foregoing description is given by way of example of one track seek, the following description will be given by way of example of 16-track seek.

Figure 13A:
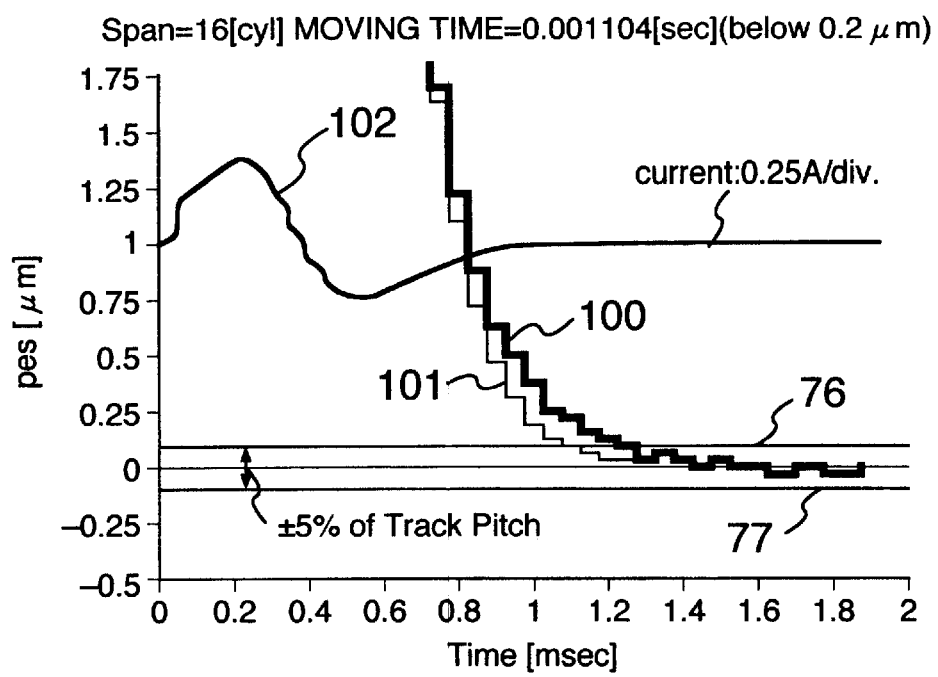
FIGS. 13A and 13B are graphic representations showing a response waveform of 16-track seek when the signal 34 generated from Gff(z) pursuant to equations (22) and (9) is used for acceleration feed-forward and correction of target position orbit is carried out in accordance with equation (10) modeling the primary resonance oscillation.
Figure 13B:
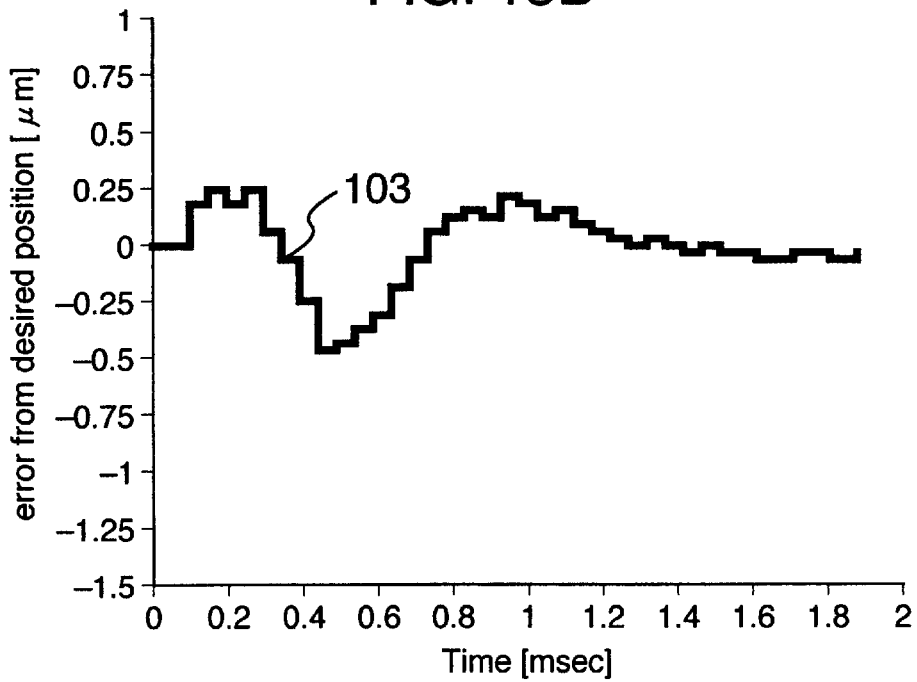

In the positioning control method of the first embodiment, $G_{p0}(z)$ is given on the basis of equation (10) containing the 3.6 kHz primary resonance model of the positioning mechanism, Gff(z) is given by equation (9) and Gm(z) represents an orbit given from equation (22) for reducing power at the 3.6 kHz frequency. Illustrated in FIG. 13A are a response waveform 100 of a position error for the target position sampled at the period Ts, a current waveform 102 at that time and an orbit 101 of the target position. It will be seen that the response 100 of the position error during settling is confined within ±5% of the track pitch in the specifications and a time required for 0.2 μm movement is 1.1 ms. Illustrated in FIG. 13B is a following error waveform 103 of the head position for the target position orbit in that case. The following error is 0.43 μm at the most.

In another application method according to the present invention, a plurality of disc apparatus are disposed in the same console and operated simultaneously, whereby a disc array system is provided which can promote speed-up and reliability of data transfer. The array system has a resonance mode inherently determined from the mass of support system and disc apparatus. In many array systems, the resonance frequency is far=500 to 800 Hz and the attenuation ratio is zar=0.03 but in case the drive pattern for seek has the resonance frequency component, resonance oscillation is excited, causing a residual oscillation after seek. In contrast, by so selecting the frequency in the numerator of equation (22) and the attenuation ratio as to coincide with "far" and "zar", respectively, excitation at that frequency can be prevented and the residual oscillation after seek can be reduced.

In connection with the moving distance of one track seek to about 16-track seek in which positioning must be done within a moving time corresponding to the primary resonance frequency of the positioning mechanism, by using in combination (1) the position and velocity orbit generating method for reducing power at the specified frequency, (2) the acceleration feed-forward compensation generating method which permits the head to reach the target position accurately even when the feedback system does not function under the condition that external disturbance does not act and (3) the method of generating the position orbit corrected by the controlled object model which accurately models the resonance oscillation of the positioning mechanism contained in the moving frequency band, the fast seek control method can be provided for the moving distance of one track seek to about 16-track seek.

What is claimed is:

1. A positioning control method for use in a positioning control mechanism comprising:

determining a position error signal from a controlled object, a target position signal of said controlled object and a position detection signal of said controlled objects;

applying the position error signal to a phase compensator; and delivering an output signal of said phase compensator to said positioning control mechanism provided with said controlled object so as to perform positioning of said controlled object, wherein, in a power spectrum density of a state quantity of said controlled object during movement of said controlled object from the present position to a target position, a target state quantity orbit is set such that power corresponding to a specified resonance frequency of said positioning control mechanism is reduced, a drive signal for said controlled object is generated from said target state quantity orbit by using an inverse model of said positioning control mechanism, said drive signal is inputted to a controlled object model having, in combination, a rigid body model and a resonance model of said positioning control mechanism to generate an orbit of a new target position, a difference signal between the present position value of said controlled object and the new target position orbit is inputted to said phase compensator, and a result of addition of an output of said phase compensator and said drive signal is used as a signal for driving said controlled object to carry out position control of said controlled object.

2. A positioning control method for use in a positioning control apparatus comprising:

determining a position error signal from a controlled object, a target position signal of said controlled object and a position detection signal of said controlled object;

applying the position error signal to a phase compensator; and delivering an output signal of said phase compensator to an actuator provided with said controlled object so as to control positioning of said controlled object, wherein a power spectrum density of a drive signal for said controlled object during movement of said controlled object from the present position to a target position is reduced at a specified resonance frequency of said controlled object, and said controlled object is settled to said target position without overshoot or undershoot.

3. A positioning control apparatus comprising:

means for determining a position error signal from a magnetic head, a target position signal of said magnetic head and a position detection signal of said magnetic head;

means for applying the position error signal to a phase compensator; and a head positioning mechanism provided with said magnetic head, for responding to an output signal of said phase compensator so as to control positioning of said magnetic head, wherein a target acceleration orbit is set such that a drive frequency characteristic of a drive signal of said magnetic head is reduced at a resonance frequency of said head positioning mechanism, said drive signal is inputted to a controlled object model having, in combination, a rigid body model and a resonance model of said head positioning mechanism including said magnetic head during a seek operation for said magnetic head a new target position orbit is generated with said controlled object model, and a difference signal between the new target position orbit and the present position signal of said magnetic head is inputted to said phase compensator so as to carry out positioning control.

4. A positioning control apparatus according to claim 3, wherein a signal obtained by adding said target acceleration orbit to the output of said phase compensator is used to control said head positioning mechanism.

* * * * *